(12) United States Patent
Fujita

(10) Patent No.: US 11,853,045 B2
(45) Date of Patent: Dec. 26, 2023

(54) INSTALLATION SUPPORT APPARATUS, INSTALLATION SUPPORT SYSTEM, AND INSTALLATION SUPPORT PROGRAM

(71) Applicant: FANUC CORPORATION, Yamanashi (JP)

(72) Inventor: Yuuki Fujita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 242 days.

(21) Appl. No.: 16/899,764

(22) Filed: Jun. 12, 2020

(65) Prior Publication Data

US 2021/0026340 A1 Jan. 28, 2021

(30) Foreign Application Priority Data

Jul. 25, 2019 (JP) ................................. 2019-137063

(51) Int. Cl.
G05B 23/02 (2006.01)

(52) U.S. Cl.
CPC .............. *G05B 23/0216* (2013.01); *G05B 2219/32014* (2013.01); *G05B 2219/37074* (2013.01)

(58) Field of Classification Search
CPC ...... G05B 23/0216; G05B 2219/32014; G05B 2219/37074
See application file for complete search history.

(56) References Cited

U.S. PATENT DOCUMENTS

| | | | | |
|---|---|---|---|---|
| 2011/0218776 A1* | 9/2011 | Shono | ..................... | G06F 30/00 703/1 |
| 2013/0083057 A1* | 4/2013 | Kobayashi | ............. | G09G 5/377 340/10.5 |
| 2014/0022412 A1* | 1/2014 | Ishihara | ............... | G06V 40/161 348/229.1 |
| 2017/0358071 A1* | 12/2017 | Yamaoka | ............... | H04N 7/183 |
| 2018/0109083 A1* | 4/2018 | Fenker | .................... | G06T 11/60 |
| 2019/0082092 A1* | 3/2019 | Ono | ..................... | H04N 23/741 |
| 2020/0029005 A1* | 1/2020 | Koizumi | ............ | H04N 5/23254 |
| 2021/0027456 A1* | 1/2021 | Moteki | ................. | G06T 7/0004 |

FOREIGN PATENT DOCUMENTS

| | | |
|---|---|---|
| JP | 2004-118772 | 4/2004 |
| JP | 2016-081391 | 5/2016 |
| JP | 2016-170656 | 9/2016 |
| JP | 2017-10353 | 1/2017 |
| JP | 2017-174088 | 9/2017 |
| JP | 2018-530800 | 10/2018 |
| WO | 2018/138877 | 8/2018 |

* cited by examiner

*Primary Examiner* — Sing-Wai Wu
*Assistant Examiner* — Khoa Vu
(74) *Attorney, Agent, or Firm* — Wenderoth, Lind & Ponack, L.L.P.

(57) ABSTRACT

Accurate wiring work shall be efficiently performed when a module group included in a control system for an industrial machine is installed. An installation support apparatus includes an image information acquisition part configured to acquire a camera image of a module included in a control system for an industrial machine, a design information acquisition part configured to specify the module on the basis of the camera image, and acquire design information relevant to wiring of the module, and a projection information processing part configured to generate a projection image based on the design information, allowing to be projected onto a position corresponding to the camera image.

6 Claims, 8 Drawing Sheets

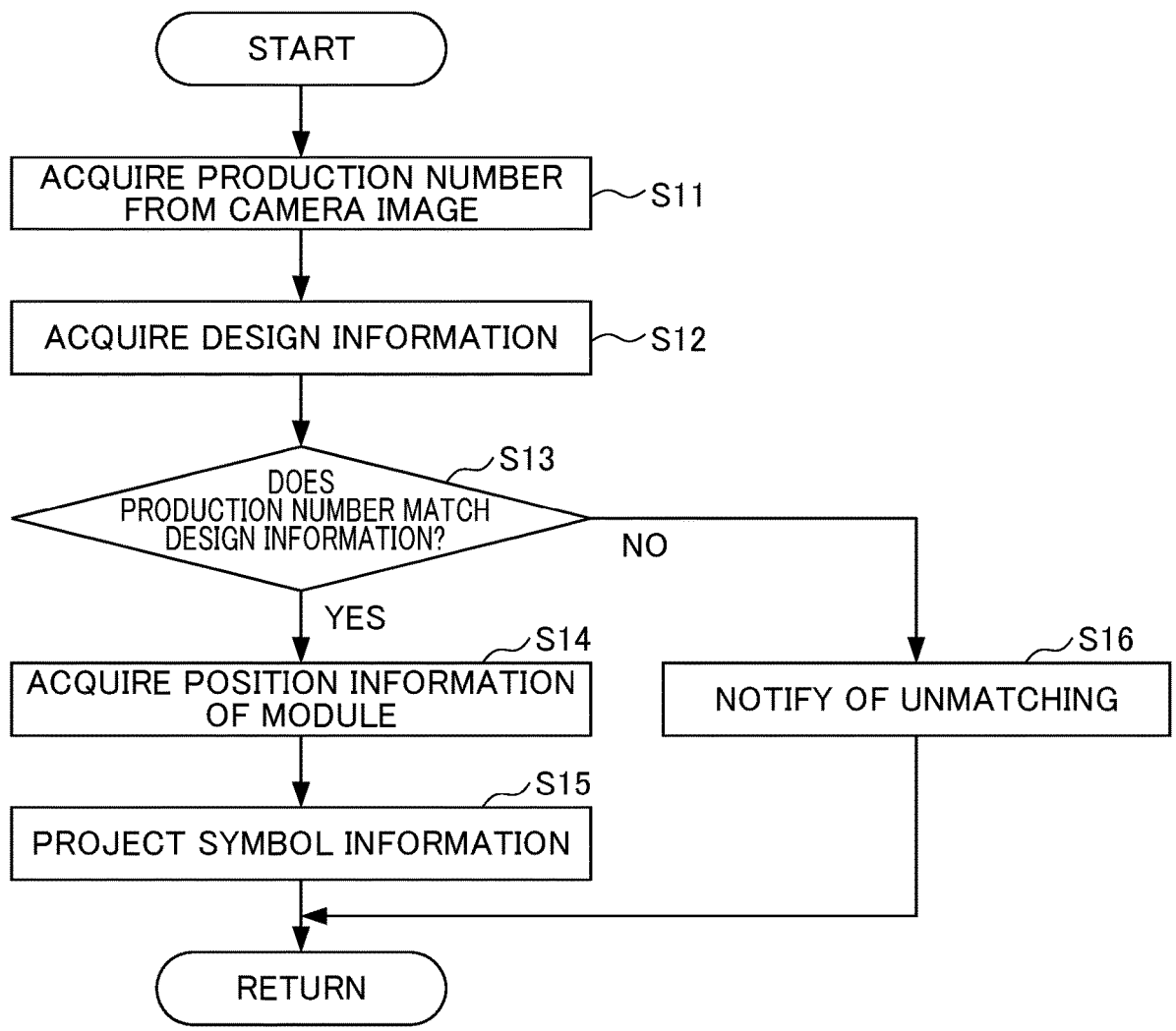

INSTALLATION SUPPORT APPARATUS, INSTALLATION SUPPORT SYSTEM, AND INSTALLATION SUPPORT PROGRAM

This application is based on and claims the benefit of priority from Japanese Patent Application No. 2019-137063, filed on 25 Jul. 2019, the content of which is incorporated herein by reference.

BACKGROUND OF THE INVENTION

Field of the Invention

The present invention relates to a support apparatus for installing a module group included in a control system for an industrial machine.

Related Art

A control device for making an industrial machine operate controls the industrial machine via a plurality of modules such as an I/F unit, an I/O unit, a power supply, and an amplifier. A control system having a more complicated configuration requires more complicated wiring work for connecting between these modules, and between a module and a device such as a switch, a sensor, and a motor. For example, Patent Document 1 discloses a management device configured to manage connection destination information of devices and display configuration diagram as for facility where a plurality of modules are arranged.

Patent Document 1: PCT International Publication No. WO2018/138877

SUMMARY OF THE INVENTION

However, in the case where the wiring work for connecting a plurality of modules is complicated due to many connection points, a worker has to alternately check a design drawing and actual wiring many times. Accordingly, a worker can make a mistake, such as a mistake in remembering a connection point when looking at the design drawing, and a mistake in connecting a fine terminal. Such work requiring frequent checking of the design drawing is inefficient. Thus, accurate wiring work shall be performed efficiently.

An installation support apparatus in one aspect of the present disclosure includes an image information acquisition part configured to acquire a camera image of a module included in a control system for an industrial machine, a design information acquisition part configured to specify the module on the basis of the camera image, and acquire design information relevant to wiring of the module, and a projection information processing part configured to generate a projection image based on the design information, allowing to be projected onto a position corresponding to the camera image.

An installation support system in one aspect of the present disclosure includes the installation support apparatus and an image projection apparatus configured to transmit the captured camera image to the installation support apparatus, and receive the projection image from the installation support apparatus and project the projection image.

An installation support program in one aspect of the present disclosure is executed to make a computer function as the installation support apparatus.

The present invention allows to efficiently perform accurate wiring work at the time of installing a module group included in a control system for an industrial machine.

BRIEF DESCRIPTION OF THE DRAWINGS

FIG. 9 is a flowchart indicating projection image generation processing in the embodiment.

DETAILED DESCRIPTION OF THE INVENTION

One example embodiment according to the present invention will be described below. An installation support apparatus in the present embodiment is realized by an information processor (computer) such as a server device or a personal computer. A worker who is involved in installing modules included in a control system for an industrial machine performs installation work, on the basis of the information of a work environment projected by AR (augmented reality) by use of an image projection apparatus equipped with a camera and a display, such as smart glasses or a tablet terminal.

Figure 1:
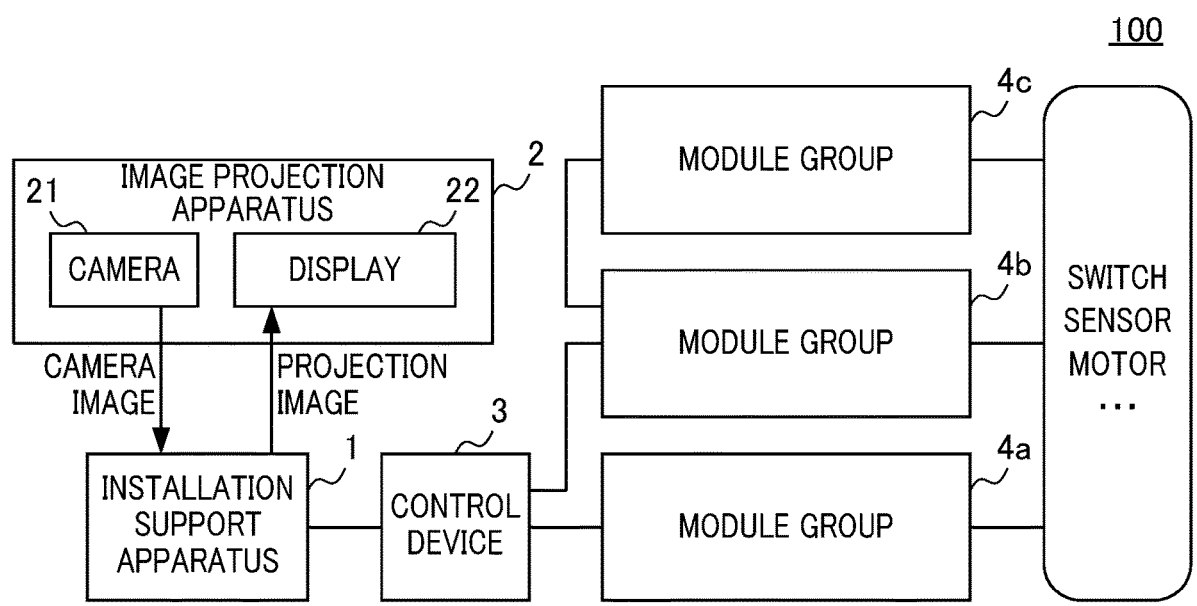
FIG. 1 is a diagram illustrating a configuration of an installation support system in one embodiment.

FIG. 1 is a diagram illustrating a configuration of an installation support system 100 in the present embodiment. The installation support system 100 includes an installation support apparatus 1 and an image projection apparatus 2. The installation support apparatus 1 and the image projection apparatus 2 are communicably connected to each other, and the image projection apparatus 2 transmits the camera image captured by a camera 21 to the installation support apparatus 1, and receives a projection image from the installation support apparatus 1 and projects the image onto a display 22. The installation support apparatus 1 is connected to a control device 3, such as a computerized numerical controller (CNC), and may transmit various types of command signals and receive control information and the like.

In an example, the control device 3 is connected by wiring to a module, such as an I/F unit or an amplifier, and further connected by wiring to a switch, a sensor, a motor and the like, via a module such as an I/O unit or an amplifier. In general, these modules are installed side by side in the slots arranged in advance in a designed order, so that a module group 4 (hereinafter, also simply referred to as a group) is formed. A plurality of the module group 4 (for example, a module group 4b and a module group 4c) may be installed and connected to each other via, for example, the I/F units or the like in the groups.

Figure 2:
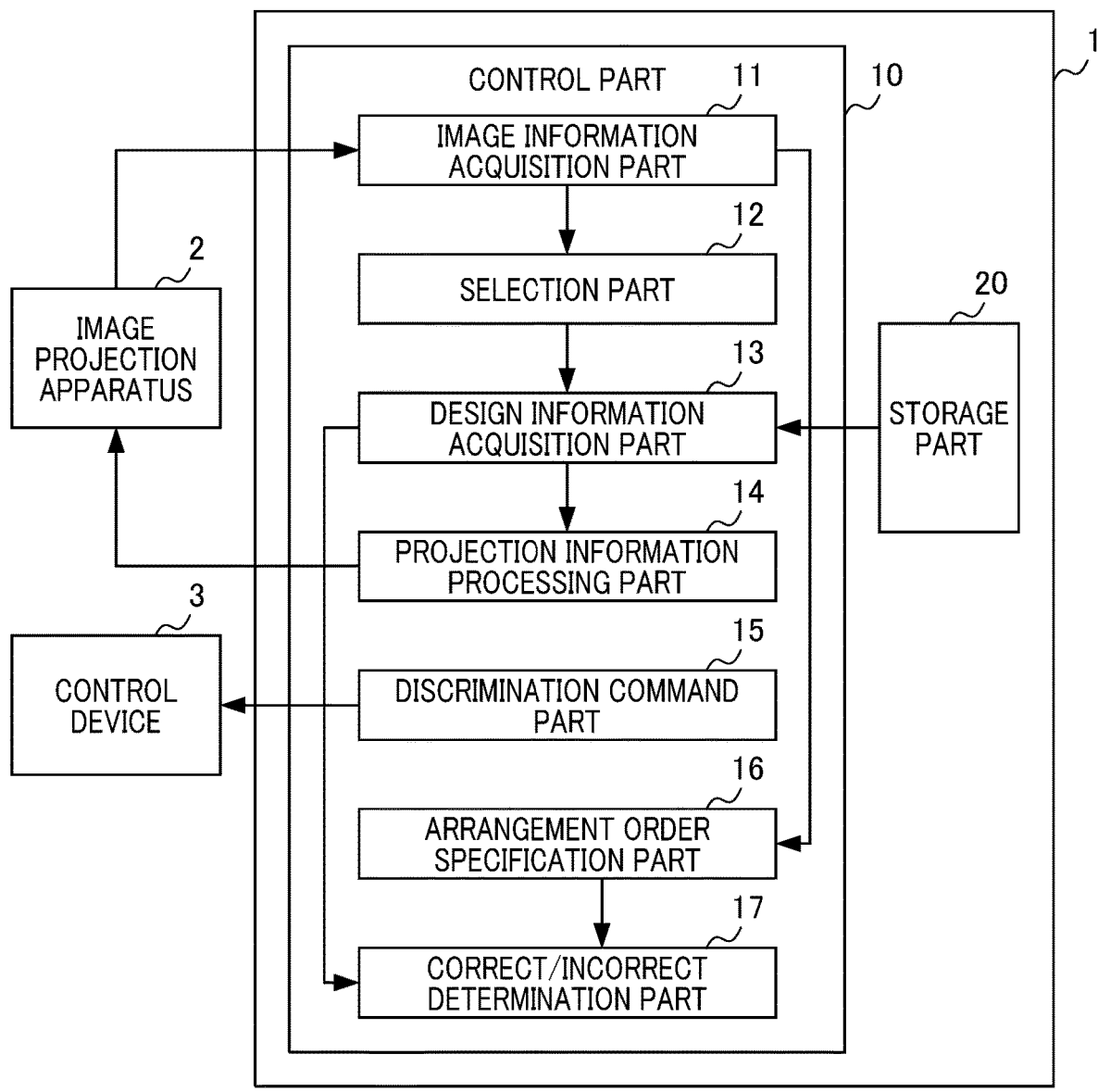
FIG. 2 is a diagram illustrating a functional configuration of an installation support apparatus in the embodiment.

FIG. 2 is a diagram illustrating a functional configuration of the installation support apparatus 1 in the present embodiment. The installation support apparatus 1 includes a control part 10 and a storage part 20. The control part 10 executes the software (installation support program) stored in advance in the storage part 20, thereby functioning as the following various types of function parts.

The control part 10 includes an image information acquisition part 11, a selection part 12, a design information acquisition part 13, a projection information processing part 14, a discrimination command part 15, an arrangement order specification part 16, and a correct/incorrect determination part 17. The storage part 20 stores design information of the control system, relevant to not only identification information of respective modules, such as image data and serial numbers (production numbers), but also arrangement orders of modules, positions and shapes of wiring terminals for respective modules, wiring points between modules, and the like.

The image information acquisition part 11 acquires the camera image of modules, from the image projection apparatus 2.

The selection part 12 selects the module to be an object of the projection image, from the plurality of modules included in the camera image. The present disclosure is not limited to specific selection means. In an example, the object module may be manually selected through a button or the like provided on the image projection apparatus. Alternatively, the selection part 12 may select the module located in the center of the camera image. In the present method, the module located in front of worker's eyes is to be selected.

The design information acquisition part 13 specifies the module to be processed, on the basis of the camera image acquired by the image information acquisition part 11, and acquires the design information relevant to the wiring of the specified module from the storage part 20. Specifically, the design information acquisition part 13 specifies the module to be processed, by acquiring, from the camera image, not only the entire and detailed shapes of the module, but also the arrangement order indicating the position counted from the I/F unit, the serial number (production number), and the like, and collating these types of information and the identification information stored in the storage part 20.

The projection information processing part 14 generates the projection image based on the design information acquired by the design information acquisition part 13, and transmits the projection image to the image projection apparatus 2, so that the projection image is projected onto the position corresponding to the camera image.

Figure 3:
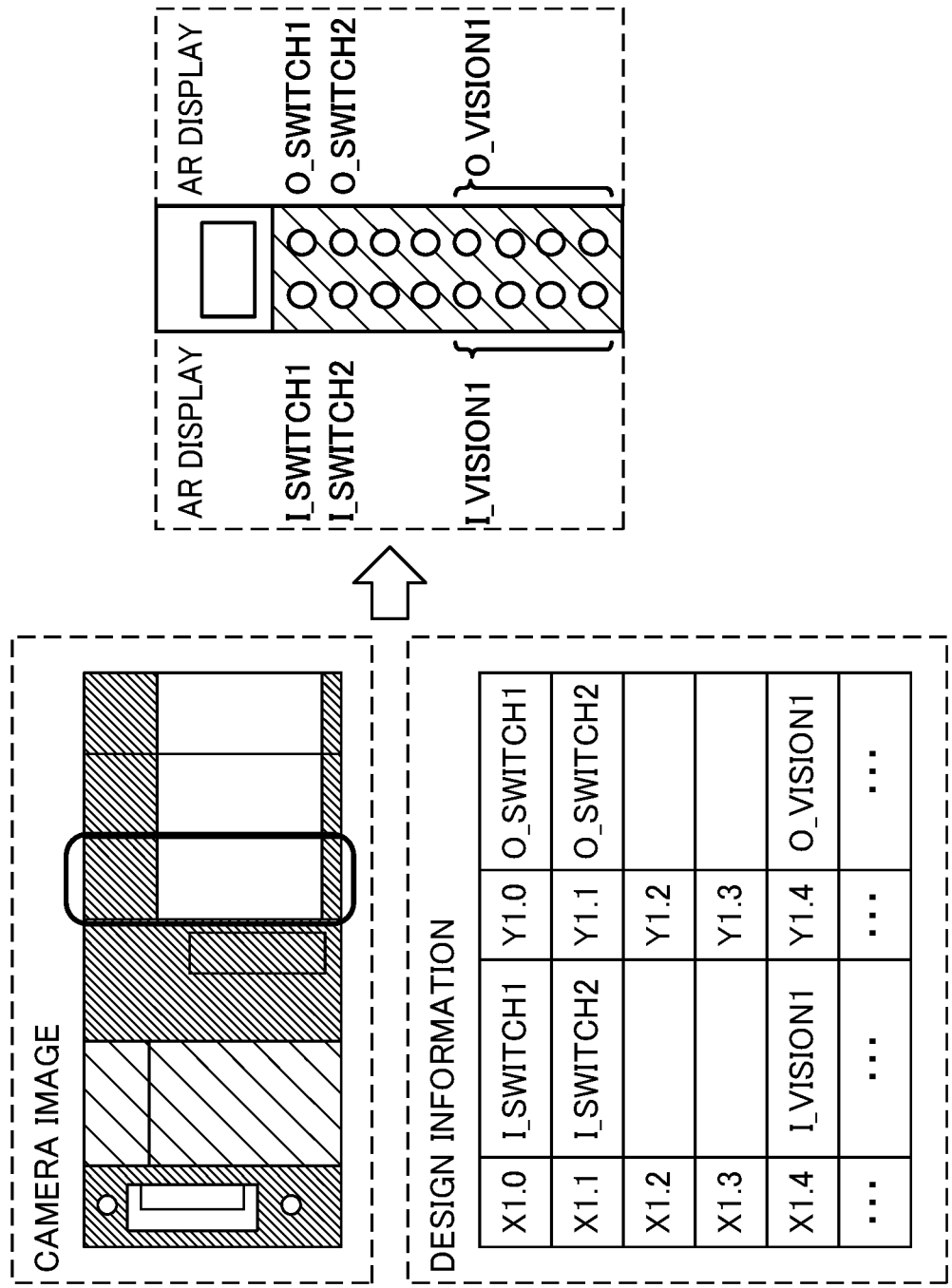
FIG. 3 is a diagram illustrating a first generation example of projection information in the embodiment.

FIG. 3 is a diagram illustrating a first generation example of the projection information in the present embodiment. In the present example, the image of the I/O unit is captured as the camera image. As the design information relevant to the I/O unit specified based on the camera image, symbol (allocation) information for respective terminals is acquired. The projection information processing part 14 determines the positions and sizes of these symbol names to be projected correspondingly to the position, size and direction of the I/O unit in the camera image, and generates the projection image to be superimposed and displayed by AR.

Figure 4:
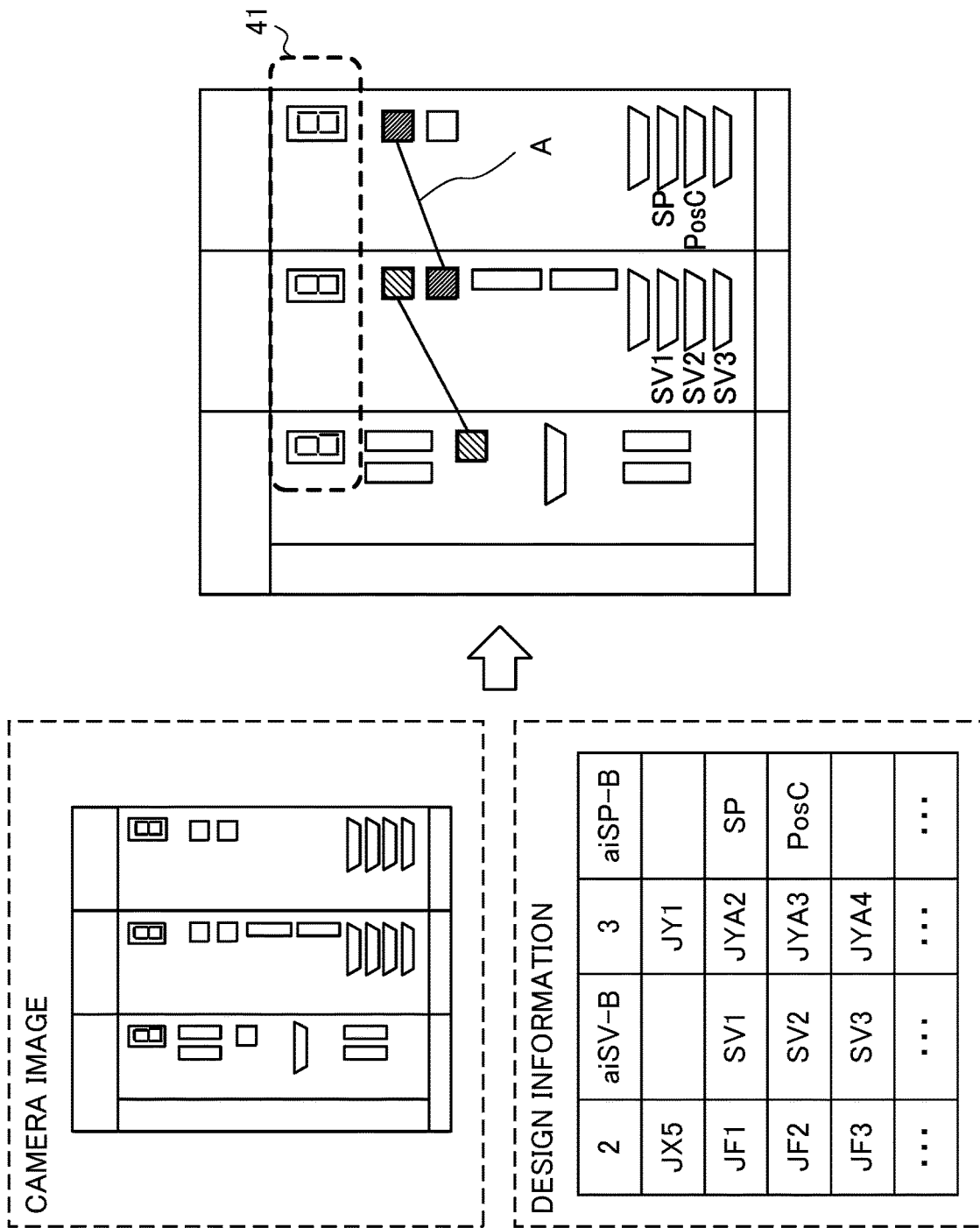
FIG. 4 is a diagram illustrating a second generation example of the projection information in the embodiment.

FIG. 4 is a diagram illustrating a second generation example of the projection information in the present embodiment. In the present example, the image of a power supply and a group of amplifiers are captured as the camera image. As the design information relevant to the amplifiers specified on the basis of the camera image, symbol information of respective terminals is acquired. The design information may further include the information indicating wiring points between modules.

The projection information processing part 14 determines the positions and sizes of the symbol names to be projected, correspondingly to the positions, sizes and directions of the amplifiers in the camera image, and generates the projection image to be superimposed and displayed by AR. The projection information processing part 14 may generate the projection image including a display (A) indicating wiring points between modules.

In the present example, each module has an information display part 41 configured with an LED or the like. After the completion of wiring, the information such as the numbers and the like indicating the connection order starting from the power supply are displayed on the information display parts 41, in response to the command issued by the connected control device 3. Thus, after the installation of the module group, a worker is able to visually confirm the connection order of the modules. It is noted that the installation support apparatus 1 may automatically determine correct/incorrect of the connection order, by acquiring the displayed information of the connection order from the camera image, and collating the acquired connection order with the connection order stored in advance as the design information.

The projection information processing part 14 further generates the projection image indicating the positions to arrange other modules in the group including the specified module, on the basis of the information of the arrangement orders of the other modules, and transmits the generated projection image to the image projection apparatus 2. The group herein is configured with a plurality of modules, and is connected to another group or to the control device by wiring via, for example, an I/F unit or an amplifier.

Figure 5:
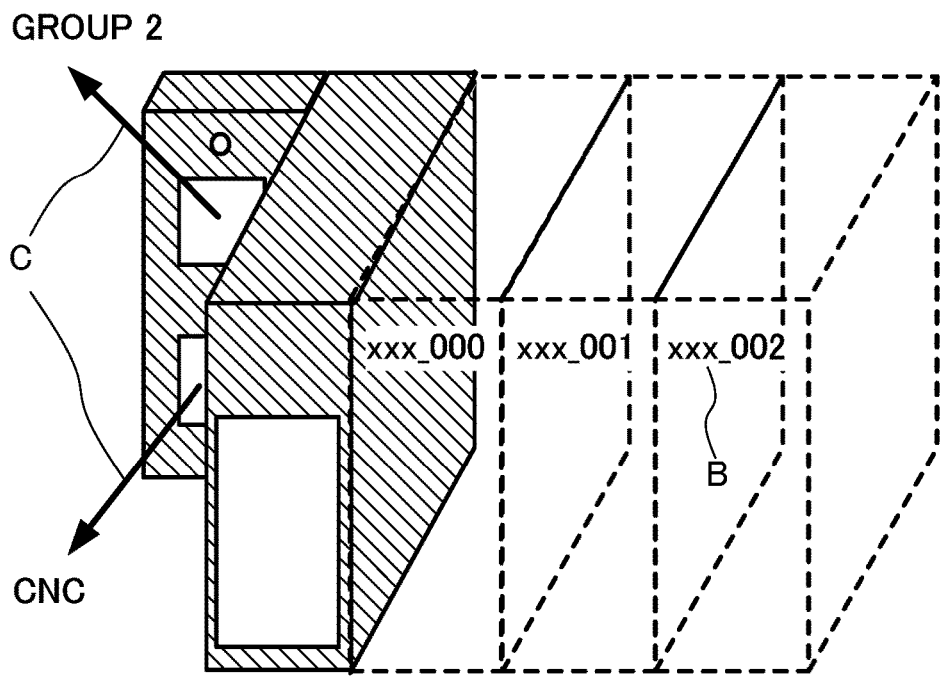
FIG. 5 is a diagram illustrating a projection example of arrangement positions of modules in the embodiment.

FIG. 5 is a diagram illustrating a projection example of the arrangement positions of modules in the present embodiment. In the present example, the I/F unit serving as a base in a group 1 is specified on the basis of the camera image. The group 1 is connected to the CNC and a group 2, and includes a plurality of I/O units.

In this case, the projection image is generated, so as to indicate the expected positions to arrange the I/O units with production numbers (B) which have not been arranged yet. The projection image further indicates the wiring points (C) to another group and the CNC. It is noted that the projection image is not limited to the image illustrating the shapes imitating the modules as illustrated, or alternatively may indicate, for example, just the symbols indicating the production numbers.

The discrimination command part 15 commands the operation of the indicators such as LEDs included in respective groups, to the control device 3, in order to discriminate the group including the specified module from other groups in the same type. In many cases, a plurality of groups including the same types of modules are hardly discriminated at a glance. Therefore, the operation of indicators, for example, blinking cycles of the LEDs of the groups may be varied mutually, thereby enabling to discriminate an object group on the basis of the camera image.

Figure 6:
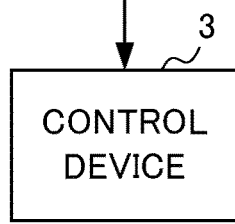
FIG. 6 is a diagram illustrating a method of discriminating groups by use of indicators in the embodiment.

FIG. 6 is a diagram illustrating a method of discriminating an object group by use of the indicators in the present embodiment. The design information includes the connection order of the plurality of groups and the blinking cycles of the LEDs for discriminating the order. In an example, the discrimination command part 15 commands blinking at the cycle of 0.5 seconds for the group 1 and the cycle of 1.0 second for the group 2, to the control device 3, on the basis of the design information.

In response to the command, when blinking commands are transferred from the control device 3 in the order corresponding to the actual connection order, the LEDs blink at the cycles corresponding to the commands according to the order. Since the blinking cycles can be determined on the basis of the camera image, the installation support apparatus 1 is able to determine the actual connection order of the groups including the modules captured in the camera image. In the installation support apparatus 1, the projection information processing part 14 may generate the projection image indicating the connection order or the group names corresponding to the connection order, or the like.

The arrangement order specification part 16 specifies the arrangement orders of the modules on the basis of the camera image. Specifically, the arrangement order specification part 16 specifies the modules and the arrangement orders thereof, on the basis of not only the shape features of the modules but also production numbers, QR codes and the like extracted from the camera image. The arrangement order is, for example, the information indicating the positions of the slots following the I/F unit serving as a base, of the arranged modules having production numbers.

The correct/incorrect determination part 17 determines whether or not the specified arrangement orders of the modules matches the design information, and performs notification indicating the determination result. It is noted that although the present disclosure is not limited to specific notification means of the determination result, the projection information processing part 14 may generate the projection image indicating unmatching.

Figure 7:
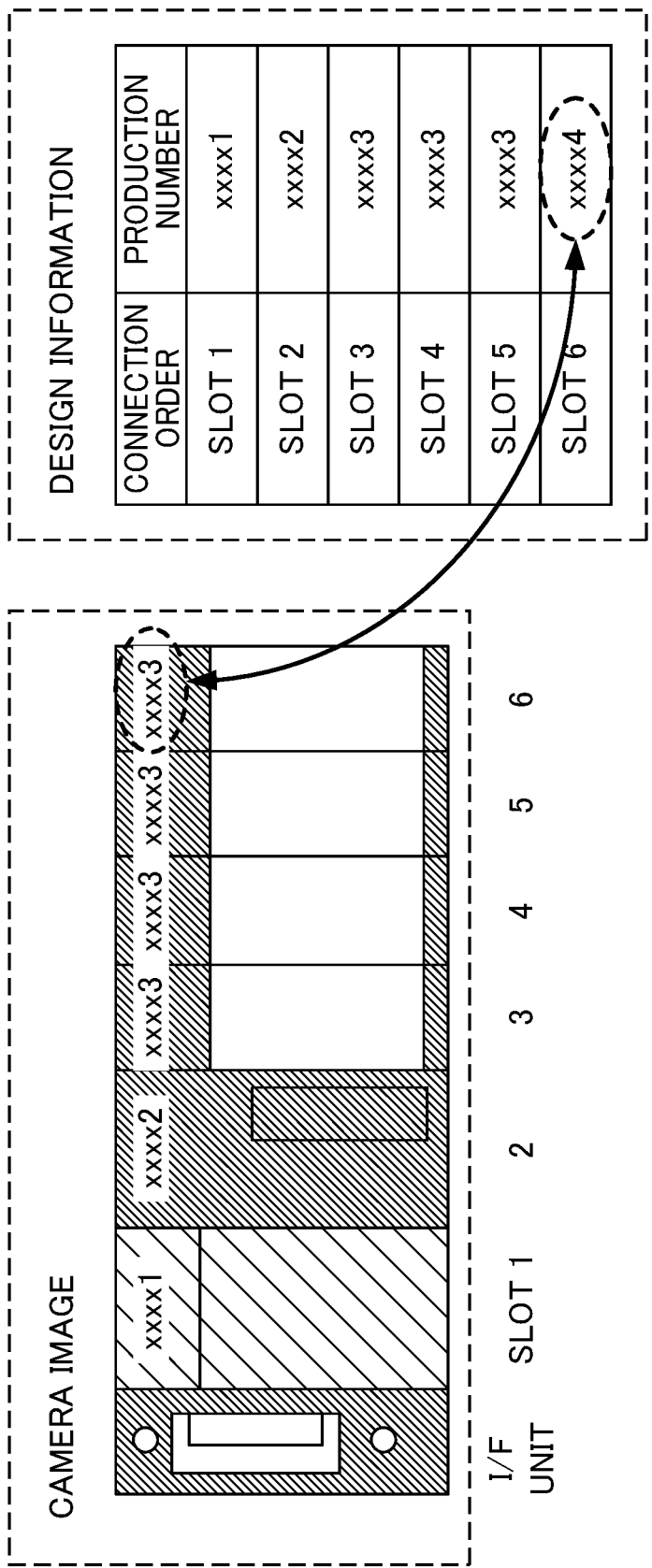
FIG. 7 is a diagram illustrating a method of collating a slot configuration in a group with design information, in the embodiment.

FIG. 7 is a diagram illustrating the method of collating the slot configuration in the group with the design information, in the present embodiment. The arrangement order specification part 16 acquires, from the camera image, the respective production numbers (xxxx1, xxxx2, etc.) of the modules arranged in the plurality of slots following the I/F unit, and the slot numbers.

In an example, when a group is discriminated on the basis of the blinking cycle of the LED commanded by the discrimination command part 15, the correct/incorrect determination part 17 acquires the production numbers of the respective modules corresponding to the connection order, as the design information of the discriminated group. The correct/incorrect determination part 17 then collates the production numbers acquired by the arrangement order specification part 16, with the design information according to the order. In the present example, since the production numbers of a slot 6 are not matched therebetween, a worker is informed of the information of the unmatching.

Figure 8:
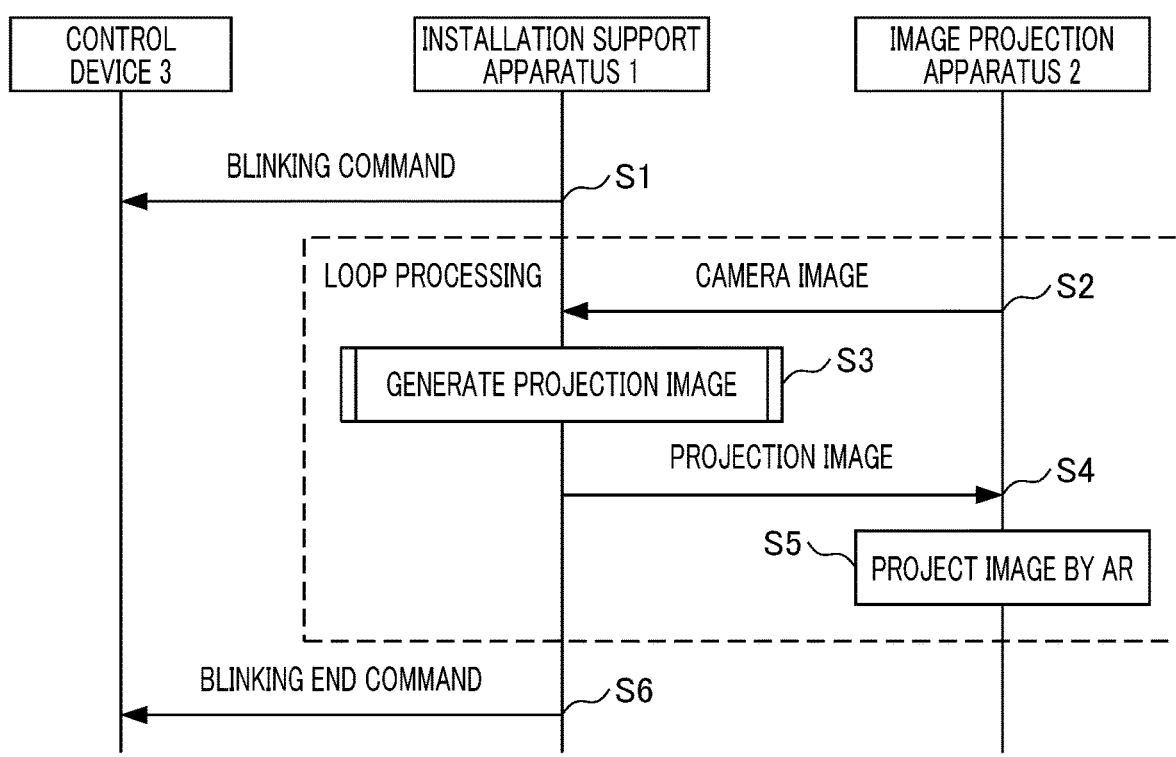
FIG. 8 is a sequence diagram illustrating processing for realizing an installation support method in the embodiment.

FIG. 8 is a sequence diagram illustrating the processing for realizing an installation support method in the present embodiment. The diagram indicates the case where the control device 3 is connected to the plurality of groups including an I/O unit.

In step S1, the discrimination command part 15 commands blinking of LEDs of respective groups to the control device 3, in order to discriminate the connection order of the groups. Thereafter, the control part 10 repeatedly executes the steps of step S2 to step S5 until the reception of an end command.

In step S2, the image information acquisition part 11 acquires the camera image from the image projection apparatus 2. In step S3, the control part 10 executes the projection image generation processing to be described below in FIG. 9. In step S4, the projection information processing part 14 transmits the generated projection image to the image projection apparatus 2. In step S5, the image projection apparatus 2 projects the received projection image by AR.

In step S6, the discrimination command part 15 commands, to the control device 3, termination of the blinking of the LEDs commanded in step S1.

FIG. 9 is a flowchart indicating the projection image generation processing in the present embodiment. The present processing corresponds to step S3 in the processing shown in FIG. 8.

In step S11, the arrangement order specification part 16 acquires the production numbers according to the arrangement order of the modules in the group, from the camera image received from the image projection apparatus 2. In step S12, the design information acquisition part 13 acquires the design information relevant to the connection order of the modules and the wiring of respective modules, in terms of the group specified by reading the LED blinking patterns.

In step S13, the correct/incorrect determination part 17 determines whether or not the production numbers acquired in step S11 match the production numbers according to the connection order included in the design information acquired in step S12. In the case where the determination is YES, the processing proceeds to step S14. In the case where the determination is NO, the process proceeds to step S16.

In step S14, the projection information processing part 14 acquires the position information (position, size, direction, etc.) of the module in the camera image. In step S15, the projection information processing part 14 generates the projection image including the symbol information such as of terminals relevant to the wiring of the module, correspondingly to the position information of the module, allowing the image projection apparatus 2 to project the generated image. In step S16, the projection information processing part 14 generates the projection image including the production number information indicating unmatching, and notifies a worker through the projection image projected by the image projection apparatus 2.

The present embodiment allows to produce the following effects, as an example.

(1) The installation support apparatus 1 includes the image information acquisition part 11 configured to acquire the camera image of the module included in the control system for an industrial machine, the design information acquisition part 13 configured to specify the module on the basis of the camera image, and acquire the design information relevant to wiring of the module, and the projection information processing part 14 configured to generate the projection image based on the design information, allowing to be projected onto a position corresponding to the camera image.

The installation support apparatus 1 with the above configuration allows to project the design information relevant to the wiring work leading from the control device 3 to the industrial machine, by AR, in terms of the module specified on the basis of the camera image. This allows a worker to visually grasp the design information while looking at the actual module, and thus the worker is able to efficiently perform accurate wiring work, when installing the module group included in the control system for the industrial machine.

(2) The installation support apparatus 1 according to (1) may include the discrimination command part 15 configured to, in order to discriminate the group including the specified module from other groups in the same type, command the operation of the indicator included in the group, to the control device 3.

The installation support apparatus 1 with the above configuration changes the operation of the indicators (for example, blinking cycles of LEDs) according to the connection order of the groups including the modules, whereby the actual connection order from the camera image can be grasped. Accordingly, the installation support apparatus 1 is able to perform notification, by specifying the group based on the design information according to the connection order. The installation support apparatus 1 is further able to determine whether or not the group specified on the basis of the camera image matches the design information.

(3) In the installation support apparatus 1 according to (1) or (2), the design information may include the information of the arrangement order of the modules. The installation support apparatus 1 may further include the arrangement order specification part 16 configured to specify the arrangement order of the specified module on the basis of the camera image, and the correct/incorrect determination part 17 configured to determine whether or not the specified arrangement order of the specified module matches the design information, and perform notification of the determination result.

The installation support apparatus 1 with the above configuration is capable of notifying the worker of a mistake in arrangement, by specifying the arrangement order of the modules on the basis of the camera image, and collating the arrangement order with the design information.

(4) In the installation support apparatus 1 according to (3), the projection information processing part 14 may generate, on the basis of the information of the arrangement order of other modules in the group including the specified module, the projection image indicating the expected positions to arrange the other modules.

The installation support apparatus 1 with the configuration above is capable of, on the basis of the information of the arrangement order of the modules in the group included in the design information, projecting the position information indicating the expected positions to arrange the modules not having been arranged yet. This allows the worker to efficiently arrange a large number of modules and perform the wiring work thereof.

(5) The installation support apparatus 1 according to any one of (1) to (4) may include the selection part 12 configured to select the module to be an object of the projection image from the plurality of modules included in the camera image.

In the case where the camera image includes a plurality of modules, the installation support apparatus 1 with the above configuration is capable of automatically selecting the object module, in response to the selection operation performed by the worker or on the basis of the position in the image, thereby enabling to improve the convenience for the worker.

Although the embodiment according to the present invention has been described so far, the present invention is not limited to the embodiment described above. The effects above in the present embodiment are indicated merely as the most preferred effects produced by the present invention. The effects produced by the present invention are not limited to those described in the present embodiment.

In the description of the present embodiment, the installation support apparatus 1 is the information processor separated from the image projection apparatus 2 and the control device 3. The present invention is not limited thereto. The various types of functions of the installation support apparatus 1 may be incorporated into the image projection apparatus 2 or the control device 3.

The installation support method by the installation support apparatus 1 is realized by software. In the case of being realized by software, the programs included in the software are installed into a computer. For the distribution of these programs to a user, these programs may be recorded in a removable medium, or may be downloaded to user's computer via a network.

EXPLANATION OF REFERENCE NUMERALS

1 INSTALLATION SUPPORT APPARATUS
2 IMAGE PROJECTION APPARATUS
3 CONTROL DEVICE
10 CONTROL PART
11 IMAGE INFORMATION ACQUISITION PART
12 SELECTION PART
13 DESIGN INFORMATION ACQUISITION PART
14 PROJECTION INFORMATION PROCESSING PART
15 DISCRIMINATION COMMAND PART
16 ARRANGEMENT ORDER SPECIFICATION PART
17 CORRECT/INCORRECT DETERMINATION PART
20 STORAGE PART
21 CAMERA
22 DISPLAY
100 INSTALLATION SUPPORT SYSTEM

What is claimed is:

1. An installation support apparatus comprising:
   an image information acquisition part configured to acquire a camera image of a module included in a control system for an industrial machine;
   a design information acquisition part configured to specify the module on a basis of the camera image, and acquire design information relevant to wiring of the module;
   a projection information processing part configured to generate a projection image based on the design information, the projection image allowing to be projected onto a position corresponding to the camera image; and
   a discrimination command part configured to, in order to discriminate a group including the specified module from other groups in a same type, command operation of each of indicators respectively included in a plurality of groups to a control device,
   wherein the discrimination command part commands, to the control device, such that the indicators perform different operations in accordance with an order in which the plurality of groups are actually connected, the order starting from the control device,
   wherein the indicators perform the different operations based on an order in which the indicators receive commands that the control device transfers in accordance with the order in which the plurality of groups are actually connected, and
   wherein each indicator includes (i) a first blinking cycle of a light emitting diode corresponding to the group including the specified module and (ii) a second blinking cycle of a light emitting diode corresponding to the other groups, the second blinking cycle being different from the first blinking cycle.

2. The installation support apparatus according to claim 1, wherein
   the design information includes information of an arrangement order of the module,
   the installation support apparatus further comprising:
   an arrangement order specification part configured to specify the arrangement order of the specified module on a basis of the camera image; and a correct/incorrect determination part configured to determine whether or not the specified arrangement order of the specified module matches the design information, and perform notification of the determination result.

3. The installation support apparatus according to claim 2, wherein the projection information processing part generates, on a basis of information of arrangement orders of other modules in the group including the specified module, a projection image indicating expected positions to arrange the other modules.

4. The installation support apparatus according to claim 1, the installation support apparatus comprising:

a selection part configured to select the module to be an object of the projection image from a plurality of modules included in the camera image.

5. An installation support system comprising:

the installation support apparatus according to claim 1; and an image projection apparatus configured to transmit the captured camera image to the installation support apparatus, and receive the projection image from the installation support apparatus and project the projection image.

6. A non-transitory computer-readable medium configured to record an installation support program for making a computer function as the installation support apparatus according to claim 1.

* * * * *